United States Patent
Bowman

[15] 3,687,881
[45] Aug. 29, 1972

[54] ZINC-CONTAINING POLYMER COMPOSITIONS

[72] Inventor: Edward L. Bowman, Bartlesville, Okla.

[73] Assignee: Phillips Petroleum Company

[22] Filed: Aug. 3, 1970

[21] Appl. No.: 60,651

[52] U.S. Cl...260/23.7 M, 260/41.5 R, 260/45.75 R, 260/79.5 B, 260/85.1, 260/752, 260/762, 260/799
[51] Int. Cl..........................C08c 11/04, C08d 11/04
[58] Field of Search..260/23.7 M, 752, 45.75 R, 799, 260/41.5 R, 762, 79.5 B

[56] References Cited

UNITED STATES PATENTS

| | | | |
|---|---|---|---|
| 908,504 | 1/1909 | Sargent | 260/762 X |
| 2,441,945 | 5/1948 | Frolich et al | 260/762 X |

*Primary Examiner*—Donald E. Czaja
*Assistant Examiner*—Donald J. Barrack
*Attorney*—Young and Quigg

[57] ABSTRACT

Zinc dust is added to rubbers, both natural and synthetic, to promote resistance of the rubbers to aging and reversion.

6 Claims, No Drawings

ZINC-CONTAINING POLYMER COMPOSITIONS

This invention relates to zinc-containing polymer compositions.

In one of its more specific aspects, this invention relates to rubber compounds into which zinc, in metallic form, is incorporated to decrease the resistance of the rubber compound to reversion and to improve its retention of properties on aging.

The reversion of emulsion polymerized elastomers, such as the styrene-butadiene rubbers, is well known. While such elastomers frequently contain zinc compounds such as zinc stearate or zinc oxide as vulcanization activators, it has now been found that the addition of metallic zinc to natural rubbers and rubbers comprising emulsion polymerized elastomers, which can employ metal carboxylates such as zinc stearate as vulcanization activators, results in increased resistance to reversion of the rubber compound with the result that higher cure temperatures and shortened cure times can be employed. The resistance to aging which such addition produces allows materials such as automobile tires to be retreaded more frequently and, in general, increases the time for the onset of undesirable properties in rubber.

According to this invention there is provided a method for improving the resistance of elastomers to reversion, which comprises incorporating in the elastomer metallic zinc dust.

Also, according to this invention, there is provided a composition of matter comprising emulsion polymerized styrene-butadiene elastomers or natural rubber, a zinc-containing activator system and particulate metallic zinc.

The method of this invention is applicable to both natural rubbers and to emulsion polymerized elastomers, conventionally known as SBR synthetic rubbers. Unless specifically designated herein, the term "rubber" shall mean both natural and emulsion polymerized synthetic types.

In general, the metallic zinc dust will be incorporated into the elastomer containing the metal carboxylate by any suitable method in an amount of from about 0.10 to about 3 parts by weight per 100 parts by weight of rubber (phr). Preferably, it will be incorporated in an amount from about 0.25 to about 1.5 phr. The metal carboxylate will be incorporated in the rubber in the amounts in which it is conventionally employed, that is from about 0.5 to about 10 phr. The metal carboxylate will preferably be zinc stearate although other zinc carboxylates can be employed, these including zinc laurate, zinc oleate and zinc octanoate.

The zinc dust can be incorporated in the rubber by conventional mixing methods. Similarly, it can be incorporated at any point during the rubber compounding procedure. The particle size of the zinc dust is not of critical significance; any commercially-available zinc dust is satisfactory.

The effect of employing zinc dust in accordance with the method of this invention is illustrated in the following data.

EXAMPLE I

In a first series of tests, a recipe was prepared of the materials indicated. A styrene-butadiene rubber, SBR 1500, an emulsion polymerized butadiene-styrene copolymer rubber meeting specification ASTM D1419–61T was employed as the base component. All other components are well known and conventional in the art and are previously identified in the art, as are the various ASTM testing procedures involved.

Into this rubber was incorporated, at various concentration levels, by conventional mixing methods, a laboratory reagent type zinc dust, available from Mallinckrodt Chemical Company, St. Louis, Missouri.

Rubber compositions and tests on the compositions were as follows:

TABLE I

| Component, Parts by Weight | Blend I | Blend II | Blend III |
|---|---|---|---|
| SBR-1500 | 100 | 100 | 100 |
| Carbon Black | 50 | 50 | 50 |
| Philrich* 5 | 10 | 10 | 10 |
| Zinc Stearate | 4 | 4 | 4 |
| Flexamine | 1 | 1 | 1 |
| Sulfur | 1.75 | 1.75 | 1.75 |
| NOBS Special | 1.2 | 1.2 | 1.2 |
| Zinc Dust | 0 | 0.3 | 2 |
| Tests on Rubber Cured 20 min. at 307° F. | | | |
| Reversion (1 in.-lb.), min.(a) | 65.0 | 73.5 | 68.5 |
| 300% Modulus, psi | 675 | 705 | 675 |
| Elongation, % | 780 | 775 | 755 |
| Tensile, psi | 3180 | 3300 | 3110 |
| After Aging 72 Hours at 212° F. | | | |
| 300% Modulus, psi | 2020 | 1975 | 2010 |
| Elongation, % | 465 | 465 | 485 |
| Tensile, psi | 3490 | 3490 | 3600 |

*Trademark
(a)Measured as the time until a 1 in.-lb. change in torque occurs from the maximum shown by use of the Monsanto Rheometer.

These data indicate that incorporation of the zinc dust increased the time to reversion with little alteration in other properties of the vulcanizate. Tensile strength was also equal to or higher than the control in the aged stocks.

EXAMPLE II

Similar rubber recipes were prepared but in these instances, zinc oxide and stearic acid were employed as vulcanization activators instead of zinc stearate.

Rubber compositions and properties were as follows:

TABLE II

| Component, Parts by Weight | Blend I | Blend II | Blend III | Blend IV |
|---|---|---|---|---|
| SBR-1500 | 100 | 100 | 100 | 100 |
| Carbon Black | 50 | 50 | 50 | 50 |
| Philrich* 5 | 5 | 5 | 5 | 5 |
| Zinc Oxide | 3 | 3 | 3 | 3 |
| Stearic Acid | 1 | 1 | 1 | 1 |
| Flexamine | 1 | 1 | 1 | 1 |
| Sulfur | 1.75 | 1.75 | 1.75 | 1.75 |
| NOBS Special | 1.2 | 1.2 | 1.2 | 1.2 |
| Zinc Dust | 0 | 0.3 | 0.5 | 1.0 |
| Tests on Rubber Cured 30 min. at 307° F. | | | | |
| Reversion (1 in.-lb.), min. | 57.8 | 38.5 | 38.0 | 38.9 |
| 300% Modulus, psi | 1110 | 1075 | 1150 | 1150 |
| Elongation, % | 665 | 680 | 650 | 635 |
| Tensile, psi | 4050 | 4080 | 4015 | 3850 |

| After Aging 24 Hours at 212° F. | | | | |
|---|---|---|---|---|
| 300% Modulus, psi | 2160 | 2130 | 2130 | 2105 |
| Elongation, % | 430 | 460 | 435 | 435 |
| Tensile, psi | 3385 | 3720 | 3440 | 3460 |

*Trademark

These data indicate that incorporation of zinc dust is not immediately beneficial in providing reversion resistance when zinc oxide and stearic acid are employed as vulcanization activators but that aged tensile strength for the stocks containing zinc dust is higher than that of stocks not containing zinc dust.

EXAMPLE III

Similar rubber recipes were prepared but in these instances, a natural rubber was employed, this natural rubber being No. 1 Smoked Sheets. Variations in the blends were made, principally in respect to the amounts of the vulcanization activators employed to determine whether incorporation of zinc dust produces beneficial results with regard to resistance to aging in natural rubber in the presence of zinc stearate and also in the presence of zinc oxide and stearic acid.

Varying only these quantities, the following blends were made and the test results below were determined in respect to original properties retained upon aging.

TABLE III

Natural Rubber Blends

| Blend No. | I | II | III | IV |
|---|---|---|---|---|
| Parts/Hundred Parts of Rubber | | | | |
| Zinc Oxide | 3 | 3 | 3 | 3 |
| Stearic Acid | 3 | 3 | 3 | 3 |
| Zinc Dust | 0 | 0.3 | 0.5 | 1.0 |
| % Retention of Original Tensile Strength After Aging at 212° F. for: | | | | |
| 1 Day | 44 | 76.5 | 81.5 | 82 |
| 3 Days | 31 | 33 | 31 | 35 |

Similar data for natural rubber having incorporated in it zinc stearate and zinc dust was as follows:

TABLE IV

Natural Rubber Blends

| Blend No. | V | VI |
|---|---|---|
| Parts/Hundred Parts of Rubber | | |
| Zinc Stearate | 4 | 4 |
| Zinc Dust | 0 | 0.5 |
| % Retention of Original Tensile Strength After Aging at 212° F. for: | | |
| 3 Days | 39 | 52 |
| 7 Days | 32.5 | 35 |

Similar data for an emulsion polymerized elastomer, SBR-1500, when employing a zinc oxide-stearic acid activator system are as follows:

TABLE V

SBR-1500 Blends

| Blend No. | I | II | III |
|---|---|---|---|
| Parts/Hundred Parts of Rubber | | | |
| Zinc Oxide | 3 | 3 | 3 |
| Stearic Acid | 1 | 1 | 1 |
| Zinc Dust | 0 | 0.3 | 0.5 |
| % Retention of Original Tensile Strength After Aging at 212° F. for: | | | |
| 1 Day | 83.5 | 92 | 85 |
| 3 Days | 80 | 85 | 82 |

The data of Tables III, IV and V indicate that the method of this invention does improve tensile strength retention of the rubber upon aging both when natural rubbers are employed or when a zinc oxide-stearic acid activator system is employed with an SBR rubber.

Summarily, then, the above examples indicate that the addition of zinc dust provides reversion resistance improvement in emulsion polymerized styrene-butadiene rubber stocks cured with a zinc stearate cure activator system. These data also indicate that zinc dust provides an improvement in the retention of tensile strength on aging in both emulsion polymerized styrene-butadiene rubber stocks and in natural rubber stocks when either of the rubber stocks is cured with either a zinc oxide-stearic acid or a zinc stearate activator system.

It will be evident that various modifications can be made to the method and composition of this invention. Such, however, are considered as being within the scope of the invention.

What is claimed is:

1. A composition of matter comprising an elastomer selected from the group consisting of emulsion polymerized styrene/butadiene elastomers and natural rubber in which resistance to aging is improved by incorporation in said elastomer of: zinc oxide, a carboxylic acid, sulfur, and a quantity of particulate metallic zinc sufficient to improve the resistance to aging.

2. The composition of matter of claim 1 in which said particulate metallic zinc is incorporated into said elastomer in an amount of from about 0.10 to about 3 parts per hundred parts by weight of said elastomer.

3. The composition of matter of claim 1 wherein said carboxylic acid is stearic acid.

4. A composition of matter comprising an elastomer selected from the group consisting of emulsion polymerized styrene/butadiene elastomers and natural rubber in which resistance to reversion is improved by incorporation in said elastomer of: a zinc carboxylate, sulfur, and an amount of particulate metallic zinc sufficient to improve the resistance of the elastomer to reversion.

5. The composition of matter of claim 4 in which said particulate metallic zinc is incorporated into said elastomer in an amount of from about 0.10 to about 3 parts per hundred parts by weight of said elastomer.

6. The composition of matter of claim 4 in which said zinc carboxylate is zinc stearate.

* * * * *